United States Patent [19]
Golin

[11] Patent Number: 5,568,569
[45] Date of Patent: Oct. 22, 1996

[54] METHOD AND APPARATUS FOR ANALYZING DIGITAL VIDEO IMAGES BY MERGING DISPLACEMENT VECTORS

[75] Inventor: Stuart J. Golin, East Windsor, N.J.

[73] Assignee: Intel Corporation, Santa Clara, Calif.

[21] Appl. No.: 258,613

[22] Filed: Jun. 10, 1994

Related U.S. Application Data

[63] Continuation of Ser. No. 999,148, Dec. 31, 1992, abandoned.

[51] Int. Cl.$^6$ .................. G06K 9/36; G06K 9/46
[52] U.S. Cl. .............. 382/236; 382/240; 348/413; 348/416
[58] Field of Search ................ 382/56, 41, 232, 382/236, 240, 276; 348/415, 416, 409, 412, 413

[56] References Cited

U.S. PATENT DOCUMENTS

| | | | |
|---|---|---|---|
| 5,028,996 | 7/1991 | Takahashi et al. | 358/136 |
| 5,151,784 | 9/1992 | Lavagetto et al. | 358/136 |

*Primary Examiner*—Leo Boudreau
*Assistant Examiner*—Phuoc Tran
*Attorney, Agent, or Firm*—William H. Murray

[57] ABSTRACT

A method and apparatus for encoding a target image within a sequence of one or more digital motion video images using motion compensation. Displacement vectors are assigned to a plurality of blocks in the target image. First and second block groups are selected from the plurality of blocks, the first and second block groups having corresponding first and second displacement vectors assigned thereto. A first error measure associated with predicting the second block group using the second displacement vector is determined. A second error measure associated with predicting the second block group using said first displacement vector is determined. An error change is obtained from the first and second error measures. A merge-factor is obtained from the error change. The second block group is reassigned to the first displacement vector if the merge-factor is less than a merge-threshold. Alternatively, displacement vectors are assigned to a plurality of parent blocks in the target image. Each parent block is divided into a plurality of target blocks. A target block is selected, and a plurality of parent blocks are associated therewith. A plurality of error measures are calculated by successively applying the displacement vector assigned to each associated parent block to the selected target block. The displacement vector associated with the minimum error measure is assigned to the selected target block if the minimum error measure is below a threshold. The target image is encoded in accordance with the displacement vectors currently assigned thereto.

23 Claims, 4 Drawing Sheets

|     |     |     |
| --- | --- | --- |
| 292 | 293 | 294 |
| 291 | 290 | 295 |
| 298 | 297 | 296 |

METHOD AND APPARATUS FOR ANALYZING DIGITAL VIDEO IMAGES BY MERGING DISPLACEMENT VECTORS

This is a continuation of application Ser. No. 07/999,148 filed on Dec. 31, 1992, now abandoned.

This invention relates to video signal processing generally and particularly to systems for providing a compressed digital video signal representative of a full color video signal.

BACKGROUND

An important aspect of most methods for compressing sequences of digital video images is motion analysis. In typical motion analysis, a target image in a sequence of images is divided into a plurality of blocks of pixels, such blocks may typically be 8×8 pixels in dimension. A target region comprising at least one pixel block is selected from the target image. The image preceding the target image is analyzed in order to locate a region of the preceding image which closely matches the target region of the target image. Block matching techniques based on mean-square-error or mean-absolute-error are typically used to locate the region of the preceding image which closely matches the target region of the target image. If no motion has occurred, the preceding and target regions will have the same coordinates within the image frame. If motion has occurred, the preceding region will be offset or translated relative to the target region by an amount which is represented by a displacement vector. This process is typically repeated for each target region in the target image, thereby yielding a displacement vector for each target region. These displacement vectors are thereafter applied to a previous reconstructed image to form a predicted image. An error image is formed from the difference between the target image and the predicted image. The displacement vectors and the error image are then encoded for subsequent use by a decoder in decoding the compressed digital video signal. A known motion compensation system is described in U.S. Pat. No. 5,134,478 to Golin, entitled "Method And Apparatus For Compressing And Decompressing A Digital Video Signal Using Predicted And Error Images", the contents of which is hereby incorporated herein by reference.

Since each target image may typically be broken up into approximately 1K blocks (8×8), it can take a substantial number of bits to separately encode a displacement vector for each block. It was found that if some or all of the displacement vectors could be made the same (or merged) without unduly increasing the bits needed to encode the error image, the result would be more efficient encoding.

When adjacent blocks having different displacement vectors are decoded, a discontinuity will typically appear at the boundary between the blocks when the predicted image is formed. Besides being unattractive visually, such discontinuities normally result in an error image which is expensive to encode, because the error image contains high frequency errors. Within limits, it was found that a superior visual result could be achieved by encoding an adjacent block with an incorrect displacement vector, if a discontinuity between blocks could be avoided. Avoiding such discontinuities has the added benefit of reducing high frequency errors which are expensive to encode.

It is an object of the present invention to provide a system for merging displacement vectors that provides for encoded images with fewer bits while yielding decoded images having an improved visual appearance.

Further objects and advantages of the invention will become apparent from the description of the invention which follows.

SUMMARY OF THE INVENTION

A method and apparatus for analyzing a sequence of one or more digital motion video images. Displacement vectors are assigned to a plurality of blocks in an image. First and second block groups are selected from the plurality of blocks, the first and second block groups being adjacent and having corresponding first and second displacement vectors assigned thereto. A first error measure associated with predicting the second block group using the second displacement vector is determined. A second error measure associated with predicting the second block group using said first displacement vector is determined. An error change is obtained from the first and second error measures. A variance value is determined from the magnitudes of the pixels in the second block group, and a merge-factor is obtained from the error change, the variance, and the number of pixels in the second block group. The second block group is reassigned to the first displacement vector if the merge-factor is less than a merge-threshold.

A method and apparatus for analyzing a sequence of one or more digital motion video images. Displacement vectors are assigned to a plurality of parent blocks in an image. Each parent block is divided into a plurality of target blocks. A target block is selected from the plurality of target blocks, and a plurality of parent blocks are associated with the selected target block. A plurality of error measures are calculated for the selected target block by successively applying the displacement vector assigned to each associated parent block to the selected target block. The displacement vector associated with the minimum error measure is selected from the plurality of error measures. The selected displacement vector is assigned to the selected target block if the minimum error measure is below a threshold.

DETAILED DESCRIPTION OF THE PREFERRED EMBODIMENT

In accordance with the present invention, a target image is divided into blocks 16×16 pixels in dimension, although pixel blocks of other dimensions may be used. Displacement vectors are assigned to each pixel block in the target image using known motion analysis methods. In the preferred embodiment, a one-dimensional merging analysis (shown in FIG. 1) is next applied to each column of blocks and then to each row of blocks in the target image. Thereafter, a two-dimensional merging analysis (shown in FIG. 2) is applied to each group of blocks in the target image. Finally, displacement vectors are assigned to each 8×8 pixel block by applying a quartering analysis (shown in FIG. 4) to each 16×16 block in the target image. Although in the preferred embodiment, the one-dimensional merging analysis, the two-dimensional merging analysis and the quartering analysis are performed together in sequence, each of these methods may used independently or in combination with only one of the other methods to merge displacement vectors within a target image.

As used herein, the terms "group of blocks" or "block groups" refer to a set of one or more "adjacent" blocks having the same displacement vector. Where a one-dimensional merging analysis is being applied to a column of blocks, adjacent blocks must be vertically adjacent; where a one-dimensional merging analysis is being applied to a row of blocks, adjacent blocks must be horizontally adjacent. Where a two-dimensional merging analysis is being performed, adjacent blocks must be 4-connected as described in FIG. 2A.

One-Dimensional Merging

Figure 1:
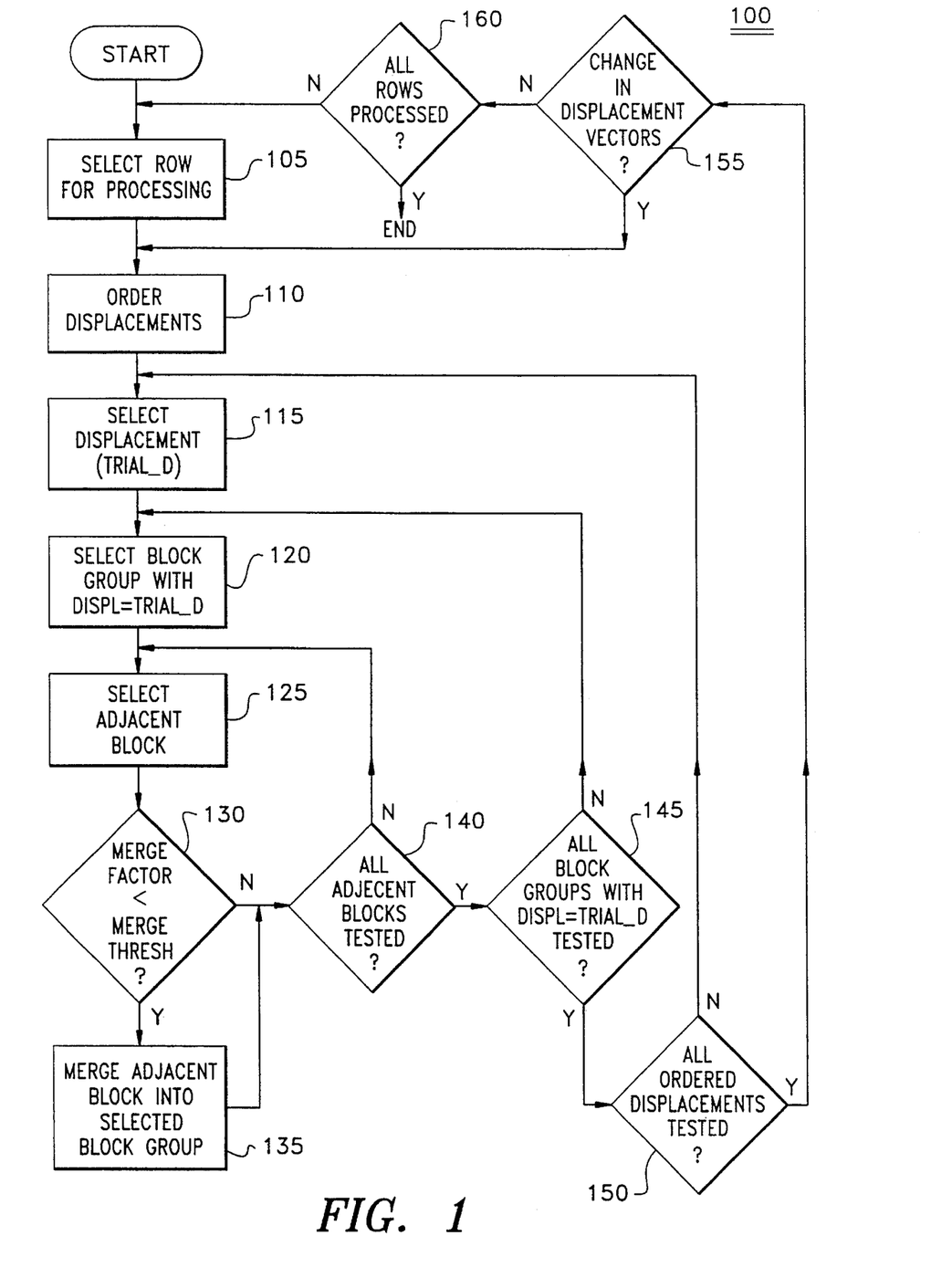
FIG. 1 is a flow diagram illustrating a system for merging displacement vectors in one dimension according to a preferred embodiment of the present invention.

Referring now to FIG. 1, there is shown a flow diagram illustrating a system 100 for merging displacement vectors in one dimension according to a preferred embodiment of the present invention. As stated above, the one-dimensional merging analysis is preferably applied on a column-by-column basis to each column of pixel blocks in the target image, and then on a row-by-row basis to each row of pixel blocks in the target image. In the preferred embodiment, this result is achieved by first transposing the array of blocks and operating on the transposed array on a row-by-row basis in accordance with system 100, and then transposing these processed rows and repeating the process. In alternate embodiments, one-dimensional merging can be applied iteratively. For example, merge all rows and then all columns, and then repeat the process one or more times until there are no further changes in displacement vector assignments. In this alternate embodiment, the thresholding value used for merging (Mergethresh) can be gradually reduced after each iteration.

Referring still to FIG. 1, row selection means 105 is provided for selecting a row of pixel blocks from the target image for processing. Displacement ordering means 110 identifies the displacement vector assigned to each block in the target image, and orders the displacement vectors in accordance with their frequency of occurrence. Displacement ordering means 110 preferably orders the displacement vectors in descending order of occurrence so that the one having the highest frequency of occurrence is first and the one having the lowest frequency of occurrence is last. Thus, for example, if one of three different displacement vectors A, B, C was associated with each block in the target image, with displacement vector B being associated with the most blocks in the target image and displacement vector C being associated with the fewest blocks in the target image, means 110 would order the displacements as follows: B, A, C.

Displacement vector selector means 115 is provided for selecting a displacement vector (Trial_D) from the ordered list of displacement vectors assembled by means 110. Means 115 preferably selects first the displacement vector in the selected row having the highest frequency of occurrence in the target image. In the preferred embodiment, after all block groups in the selected row associated with this selected displacement vector are processed, means 115 selects the displacement vector in the selected row having the second highest frequency of occurrence in the target image and all block groups associated with this displacement vector are processed. The process is then repeated in descending order of occurrence for all remaining displacement vectors that appear on the order list assembled by means 110, until all block groups in the selected row associated with the displacement vector having the lowest frequency of occurrence are processed.

Block group selector means 120 is provided for selecting a first block group having an associated displacement vector equal to Trial_D, and block group selector means 125 is provided for selecting a second block group positioned adjacent to the first block group. Merge testing means 130 is provided for determining whether to "merge" the second block group into the first block group. If means 130 determines that the second block group should be merged into the first block group, merging means 135 assigns the displacement vector Trial_D to the second block group. Means 140 is provided for repeating the process from means 125 for each block group that is adjacent to the first block group, which grows after the merge, means 145 is provided for repeating the process from means 120 for each block group having an associated displacement vector equal to Trial_D, and means 150 is provided for repeating the process from means 115 for each displacement vector (in descending order of occurrence) on the ordered list that appears in the selected row.

In the preferred embodiment, merge testing means 130 determines a first error measure associated with predicting the second block group using its originally assigned displacement vector, and a second error measure associated with predicting the second block group using Trial_D as its displacement vector. In the preferred embodiment, mean-square-error calculations are used to determine the first and second error measures. In alternative embodiments, calculations based on mean-absolute-error or correlation values may be used to determine the first and second error measures. Merge testing means 130 also determines an error change from the first and second error measures. In the preferred embodiment, the error change represents the difference between the mean-square-error that would result from predicting the second block group using its originally assigned displacement vector (the first error measure) and the mean-square error that would result from predicting the second block group using Trial_D as its displacement vector (the second error measure). The error change will be negative where predicting the second block group with displacement vector Trial_D results in a reduced mean-square-error value. In addition, merge testing means 130 calculates the statistical variance of the magnitudes of the pixels in the second block group.

In the preferred embodiment, after determining the first and second error measures, the error change and the variance, merge testing means 130 calculates a MergeFactor in accordance with equation (1) below:

$$\text{MergeFactor}=(\text{Numpels}*\text{Deltamse})/(\text{var}+k0*q^2+k1*\text{mse}) \qquad (1)$$

Where, "Numpels" represents the number of pixels (in the second block group) involved in the merge; "Deltamse" is the signed increase in the mean-square-error that results from predicting the second block group with a displacement vector of Trial_D; "var" is the statistical variance of the pixels in the second adjacent block group; "mse" is the mean-square-error that results from predicting the second block group using its originally assigned displacement vector; "q" is the current quantization being used; and k0 and k1 are constants with typical values of 0.25 and 0.1, respectively.

In the preferred embodiment, merge testing means 130 determines whether a merge should take place by comparing the MergeFactor to a MergeThresh. In one-dimensional merging, MergeThresh is preferably a constant with a typical value of 3.0. Merging means 135 merges the second block group into the first block group if MergeFactor is less than MergeThresh.

After means 150 determines that all displacement vectors in the ordered list have been processed, means 155 determines whether any change in displacement vector assignments occurred during the most recent one-dimensional merging process by comparing the current displacement vector assignments for each block in the row with the displacement vector assignments that existed before the most recent one-dimensional merging process was applied to the row. Alternatively, means 155 can determine whether any change in displacement vector assignments occurred by testing to see whether a logical variable is set to a TRUE condition. In this embodiment, the logical variable is initialized to FALSE by means 110 and set to TRUE by means 135 if a merge does take place. If any change in the displacement vector assignments has occurred as a result of the most recent one-dimensional merging process, the process is repeated from means 110. This repetition continues until application of the merging process from means 110 results in no further changes to the displacement vector assignments. Finally, means 160 is provided for repeating the above one-dimensional merging process for each row in the target image.

Two-Dimensional Merging

Figure 2:
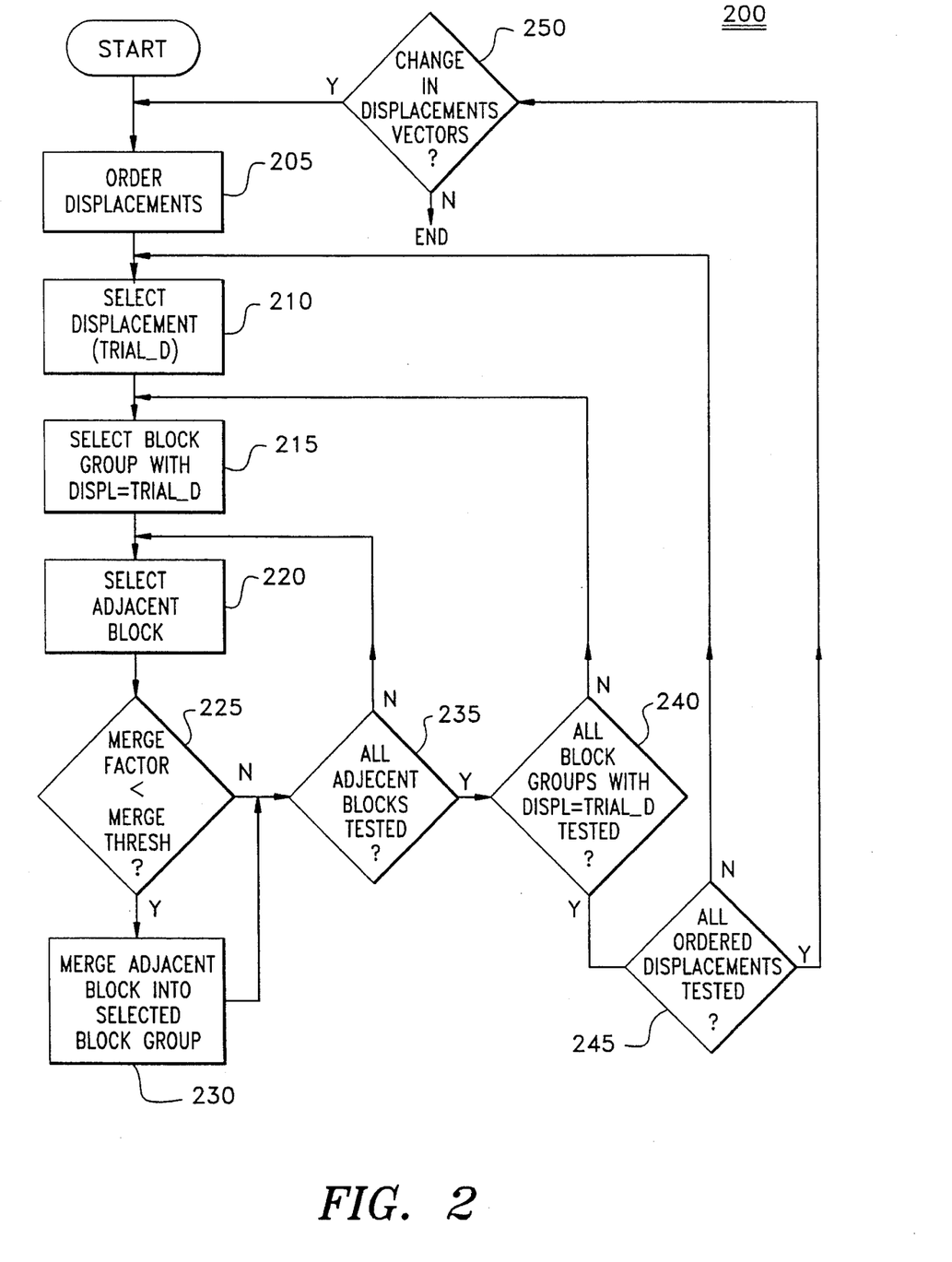
FIG. 2 is a flow diagram illustrating a system for merging displacement vectors in two dimensions according to a preferred embodiment of the present invention.

In the preferred embodiment, after the one-dimensional merging analysis described above is applied to the columns and rows of blocks in the target image, a two-dimensional merging analysis is applied to the blocks in the target image. FIG. 2 shows a flow diagram illustrating a system 200 for merging displacement vectors in two dimensions according to a preferred embodiment of the present invention. In accordance with the system shown, displacement ordering means 205 identifies a displacement vector for each block in the target image, and orders the displacement vectors in accordance with their frequency of occurrence. Displacement ordering means 205 operates substantially in accordance with means 110.

Figure 2A:
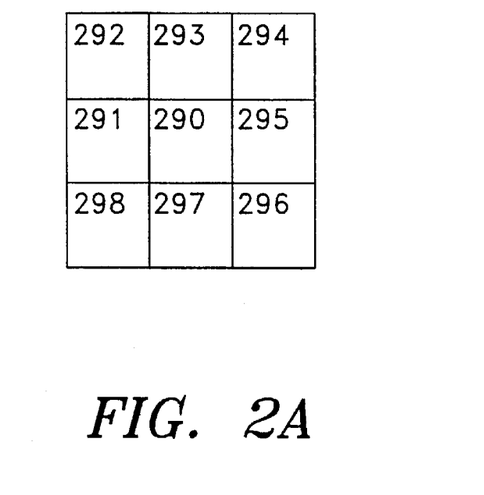
FIG. 2A is a diagram illustrating a pixel block that is 4-connected to several of its neighbors.

As noted above, the terms "group of blocks" or "block groups" are used herein to refer to a set of one or more "adjacent" blocks having the same displacement vector. For purposes of the two-dimensional merging analysis of system 200, blocks are considered adjacent if they are 4-connected. Blocks are 4-connected if they share a common horizontal or vertical boundary line. In the example of FIG. 2A, blocks 291, 293, 295 and 297 are each 4-connected to block 290, while blocks 292, 294, 296 and 298 are not 4-connected to block 290. Thus, in two-dimensional merging, for each block in a block group, there will be a 4-connected path between that block and all other blocks in the block group.

Displacement vector selector means 210 is provided for selecting a displacement vector (Trial_D) from the ordered list of displacement vectors assembled by means 205. Means 210 preferably selects first the displacement vector having the highest frequency of occurrence. In the preferred embodiment, after all block groups associated with this selected displacement vector are processed, means 210 selects the displacement vector having the second highest frequency of occurrence and all block groups associated with this displacement vector are processed. The process is then repeated in descending order of occurrence for all remaining displacement vectors on the order list assembled by means 205, until all block groups associated with the displacement vector having the lowest frequency of occurrence are processed.

Block group selector means 215 is provided for selecting a first block group having an associated displacement vector equal to Trial_D, and block group selector means 220 is provided for selecting a second block group position adjacent to the first block group. Merge testing means 225 is providing for determining whether to "merge" the second block group into the first block group. Merge testing means 225 functions substantially in accordance with merge testing means 130, with two exceptions. First, in merge testing means 225, the first and second block groups being tested do not necessarily lie in the same row or column of the target image. Second, in contrast to means 130, merge testing means 225 calculates MergeThresh in accordance with equation (2) below:

$$\text{MergeThresh}=k2*\text{num\_adj} \qquad (2)$$

Where "num_adj" is the number of blocks having a displacement vector equal to Trial_D that share a common horizontal or vertical boundary with the second block group, and k2 is a constant with a typical value of 3.0.

If means 225 determines that the second block group should be merged into the first block group, merging means 230 assigns the displacement vector Trial_D to the second block group. Means 235 is provided for repeating the process from means 220 for each block group that is adjacent to the first block group, means 240 is provided for repeating the process from means 215 for each block group having an associated displacement vector equal to Trial_D, and means 245 is provided for repeating the process from means 210 for each displacement vector (in descending order of occurrence) on the order list of displacement vectors assembled by means 205.

After means 245 determines that all displacement vectors in the ordered list have been processed, means 250 determines whether any change in displacement vector assignments occurred during the most recent two-dimensional merging process by comparing the current displacement vector assignments for each block in the target image with the displacement vector assignments that existed before the most recent two-dimensional merging process was applied to the target image. Alternatively, means 250 can determine whether any change in displacement vector assignments occurred by testing to see whether a logical variable is set to a TRUE condition. In this embodiment, the logical variable is initialized to FALSE by means 205 and set to TRUE by means 230 if a merge does take place. If any change in the displacement vector assignments has occurred as a result of the two-dimensional merging process, the process is repeated from means 205. This repetition continues until application of the two-dimensional merging process from means 205 results in no further changes to the displacement vector assignments.

Quartering

In the preferred embodiment, a one-dimensional merging analysis first is applied to the columns and rows of 16×16 pixel blocks in the target image. Next, the two-dimensional merging analysis described above is applied to these blocks. Finally, a quartering analysis is applied to each pixel block in the target image. During the quartering process, each 16×16 pixel block (or parent pixel block) is divided into a plurality of target pixel blocks. In the preferred embodiment shown in FIG. 3, each parent block 310, 320, 330, 340 is divided into four target blocks which are each 8×8 pixels in dimension. Thus, parent pixel block 310 is divided into target blocks 312, 314, 316, 318; parent pixel block 320 is divided into target blocks 322, 324, 326, 328; parent pixel block 330 is divided into target blocks 332, 334, 336, 338; and parent pixel block 340 is divided into target blocks 342, 344, 346, 348. If the target block size were 16×16 (as opposed to 8×8), the quartering analysis described in this section would preferably begin with parent blocks that were 32×32 pixels in dimension.

Figure 4:
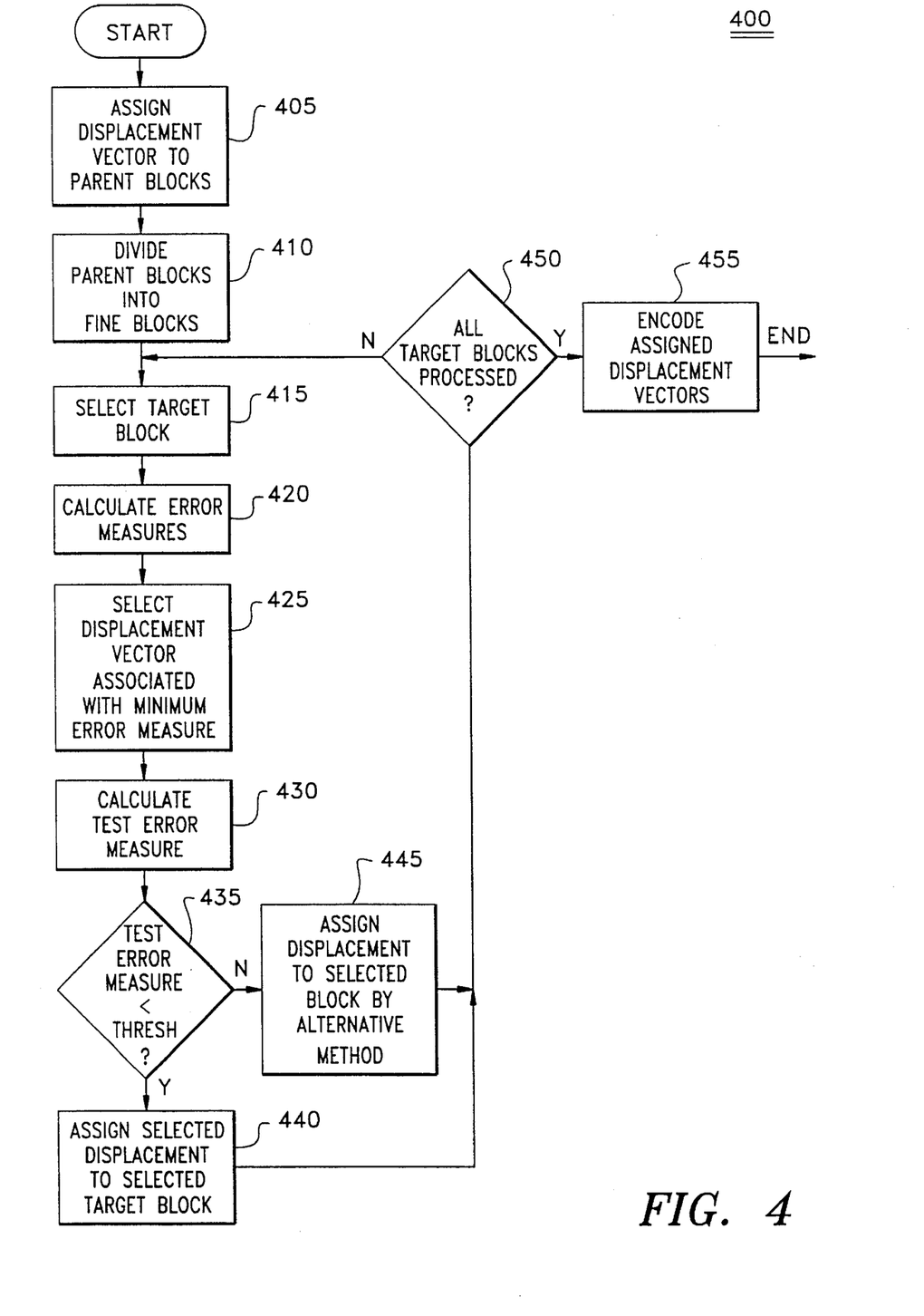
FIG. 4 is a flow diagram illustrating a system for assigning displacement vectors to target pixel blocks according to a preferred embodiment of the present invention.

Referring now to FIG. 4, there is shown a flow diagram illustrating a system 400 for assigning displacement vectors to target pixel blocks according to a preferred embodiment of the present invention. In accordance with the system shown, displacement vector assignment means 405 is provided for assigning a displacement vector to each parent block in the target image. In the preferred embodiment, means 405 begins by assigning initial displacement vectors to each parent block using known motion analysis methods. Thereafter, the initial displacement vector assignments are modified using first the one-dimensional merging analysis and thereafter the two-dimensional merging analysis described above.

Figure 3:
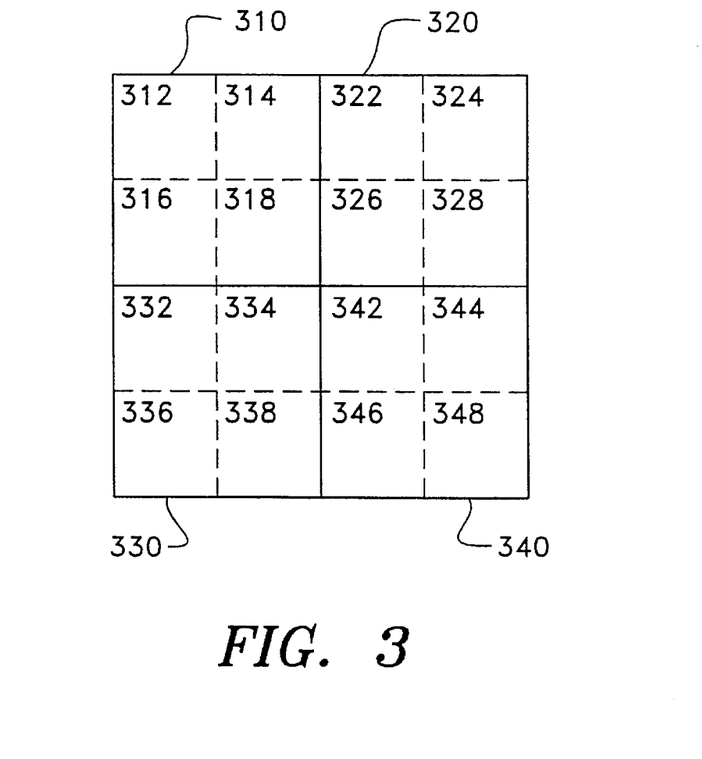
FIG. 3 is a diagram illustrating four parent pixel blocks that have been quartered into sixteen target pixel blocks.

Block division means 410 is provided for dividing each parent block into a plurality of target blocks as shown in FIG. 3. Target block selector means 415 selects a target block for processing. In the preferred embodiment shown in FIG. 3, each target block in the target image is associated with four parent blocks. These four associated parent blocks include the one parent block that the selected target block lies within and the three other parent blocks that border the selected target block. Thus, by way of example, target block 318 will be associated with parent block 310 (in which target block 318 lies) and with parent blocks 320, 330 and 340 (which border target block 318).

Error measurement means 420 is provided for determining a plurality of error measures for the selected target block by successively applying the displacement vector assigned to each associated parent block to the selected target block. Thus, continuing with the example of target block 318, in the preferred embodiment means 420 will calculate first, second, third and fourth error measures in accordance with the errors that would result from predicting target block 318 with the displacement vectors assigned to parent blocks 310, 320, 330 and 340, respectively. Means 420 preferably calculates these error measures based on the mean-square-error that would result from predicting the selected target block with the displacement vectors described above. In alternative embodiments, means 420 may use calculations based on mean-absolute-error or correlation values to determine these error measures.

Displacement vector selector means 425 is provided for selecting, based on the plurality of error measures determined by means 420, that displacement vector which, when used to predict the selected target block, results in the minimum error measure. Thus, continuing with the example of target block 318, means 425 will identify the minimum of the four error measures determined by means 420, and it will then select the displacement vector associated with that minimum error measure.

Means 430 is provided for calculating a test error measure for the selected target block based on the minimum error measure identified by means 425. In the preferred embodiment, the test error measure is determined in accordance with equation (3) below:

$$\text{Test\_Error} = \text{minimum mse}/(\text{var}+k3*q^2) \quad (3)$$

Where, "minimum mse" is the minimum error measure (based on a mean-square-error determination) identified by means 425, "var" is the statistical variance of the magnitudes of the pixels in the selected target block; "q" is the current quantization; and k3 is a parameter having a typical value of 0.25.

Test error thresholding means 435 is provided for comparing the test error measure to a threshold value. In the preferred embodiment, the threshold value is set to 2.0. If the test error measure is less than the threshold, then means 440 assigns the displacement vector selected by means 425 to the selected target block; otherwise, means 445 assigns a displacement vector to the selected target block using an alternative method such as the block matching technique described in U.S. Pat. No. 5,134,478 to Golin, entitled "Method And Apparatus For Compressing And Decompressing A Digital Video Signal Using Predicted And Error Images", the contents of which is hereby incorporated herein by reference.

Means 450 is provided for determining whether each target block in the target image has been processed. If each target block has not been processed, means 450 directs that the process be repeated from means 415 until each target block in the target image has been processed. Once this processing is complete, means 455 encodes the displacement vectors assigned to each of the target blocks in the target image.

The present invention may be implemented using an Intel model i860 parallel processor or a general purpose processor. The present invention may be embodied in other specific forms without departing from the spirit or essential attributes of the invention. Accordingly, reference should be made to the appended claims, rather than the foregoing specification, as indicating the scope of the invention.

What is claimed is:

1. A computer implemented method for forming an encoded digital video signal from a target digital video signal representative of a target digital video image within a sequence of one or more digital motion video images using motion analysis, said target digital video image being represented by an array of pixels, comprising the steps of:

(A) assigning displacement vectors to a plurality of blocks of pixels in said target digital video image by block matching a pixel block in a previous image with each of said plurality of pixel blocks in said target digital video image;

(B) selecting first and second pixel block groups from said plurality of blocks of pixels, said first and second pixel block groups being adjacent and having corresponding first and second displacement vectors assigned thereto, said first and second displacement vectors being different;

(C) determining a first error measure associated with predicting said second pixel block group from said previous image using said second displacement vector;

(D) determining a second error measure associated with predicting said second pixel block group from said previous image using said first displacement vector;

(E) determining an error change from the results of steps (C) and (D);

(F) determining a variance value in accordance with the magnitudes of the pixels in said second pixel block group;

(G) calculating a merge-factor in accordance with said error change, said variance, and the number of pixels in said second pixel block group;

(H) reassigning said first displacement vector to said second pixel block group and thereby forming a reassigned displacement vector if said merge-factor is less than a merge-threshold; and (I) forming said encoded digital video signal from said target digital video signal in accordance with said reassigned displacement vector.

2. The method of claim 1, wherein each of said first and second selected block groups is comprised of one or more adjacent blocks having the same displacement vector assigned thereto in step (A).

3. The method of claim 2, wherein step (G) comprises the step of:

(G) calculating a merge-factor in accordance with said error change, said variance, said number of pixels in said second block group, and the current quantization, and wherein said error change represents the difference between first and second mean-square-error values.

4. The method of claim 1, wherein said plurality of blocks of pixels comprises a row of pixel blocks in said target digital video image and said first and second adjacent pixel block groups are next to each other and in said row.

5. The method of claim 4, wherein step (A) comprises the steps of:

1. assigning displacement vectors to said plurality of blocks of pixels in said target digital video image; and
2. ordering said displacement vectors in accordance with their frequency of occurrence in said target digital video image, and wherein said first selected pixel block group is associated with the displacement vector having the highest frequency of occurrence.

6. The method of claim 5, wherein step (I) further comprises the steps of:

1. applying steps (B)–(H) iteratively by successively selecting as said first pixel block group each pixel block group in said row associated with said displacement vector having said highest frequency of occurrence;
2. repeating step (I)(1) for each pixel block group in said row associated with displacement vectors having lower frequencies of occurrence;
3. encoding said plurality of blocks of pixels in accordance with their assigned displacement vectors.

7. The method of claim 6, further comprising the step of repeating steps I(1) through I(2) until there is no change in displacement vector assignments.

8. The method of claim 1, wherein steps (B)–(H) are applied to each column of blocks of pixels in said image and then to each row of blocks of pixels in said image.

9. The method of claim 1, wherein there is a 4-connected path between each block of pixels in said first pixel block group and all other pixel blocks in said first pixel block group, and wherein there is a 4-connected path between each block of pixels in said second pixel block group and all other pixel blocks in said second pixel block group.

10. The method of claim 9, wherein step (A) comprises the steps of:

1. assigning displacement vectors to said plurality of blocks of pixels; and
2. ordering said displacement vectors in accordance with their frequency of occurrence in said target digital video image, and wherein said first selected pixel block group is associated with the displacement vector having the highest frequency of occurrence.

11. The method of claim 10, wherein step (I) further comprises the steps of:

1. applying steps (B)–(H) iteratively by successively selecting as said first pixel block group each pixel block group associated with said displacement vector having said highest frequency of occurrence;
2. repeating step (I)(1) for each pixel block group associated with displacement vectors having lower frequencies of occurrence;
3. encoding said plurality of blocks of pixels in accordance with their assigned displacement vectors.

12. The method of claim 11, further comprising the step of repeating steps I(1) through I(2) until there is no change in displacement vector assignments.

13. A computer implemented method for forming an encoded digital video signal from a target digital video signal representative of a target digital video image within a sequence of one or more digital motion video images using motion analysis, said target digital video image being represented by an array of pixels, comprising the steps of:

A) assigning displacement vectors to a plurality of parent pixel blocks in said target digital video image;

B) dividing each parent pixel block into a plurality of target pixel blocks;

C) selecting a target pixel block from said plurality of target pixel blocks;

D) associating a plurality of parent pixel blocks with said selected target pixel block;

E) calculating a plurality of error measures for said selected target pixel block by successively applying the displacement vector assigned to each associated parent pixel block to said selected target pixel block;

F) selecting the displacement vector associated with the minimum error measure from said plurality of error measures;

(G) assigning said selected displacement vector to said selected target pixel block if said minimum error measure is below a threshold;

(H) repeating steps (C) through (G) for each target pixel block in said plurality of target pixel blocks; and (I) forming said encoded digital video signal from said target digital video signal in accordance with said displacement vectors assigned to said plurality of target pixel blocks.

14. The method of claim 13, wherein step (G) comprises the steps of:

1. calculating a variance value based on the magnitude of the pixels in said selected target pixel block;
2. calculating a test error measure in accordance with said minimum error measure, said variance and the current quantization level; and
3. assigning said selected displacement vector to said selected target pixel block if said test error measure is below a threshold.

15. An apparatus for forming an encoded digital video signal from a target digital video signal representative of a target digital video image within a sequence of one or more digital motion video images using motion analysis, said target digital video image being represented by an array of pixels, comprising:

(A) means for assigning displacement vectors to a plurality of blocks of pixels in said target digital video image by block matching a pixel block in a previous image with each of said plurality of pixel blocks in said target digital video image;

(B) means for selecting first and second pixel block groups from said plurality of blocks of pixels, said first and second pixel block groups being adjacent and having corresponding first and second displacement vectors assigned thereto, said first and second displacement vectors being different;

(C) first error determining means for determining a first error measure associated with predicting said second pixel block group from said previous image using said second displacement vector;

(D) second error determining means for determining a second error measure associated with predicting said second pixel block group from said previous image using said first displacement vector;

(E) means for determining an error change from said first and second error determining means;

(F) means for determining a variance value in accordance with the magnitudes of the pixels in said second pixel block group;

(G) means for calculating a merge-factor in accordance with said error change, said variance, and the number of pixels in said second pixel block group;

(H) means for reassigning said first displacement vector to said second pixel block group and thereby forming a reassigned displacement vector if said merge-factor is less than a merge-threshold;

(I) means for forming said encoded digital video signal from said target digital video signal in accordance with said reassigned displacement vector.

16. The apparatus of claim 15, wherein each of said first and second selected pixel block groups is comprised of one or more adjacent blocks having the same displacement vector assigned thereto.

17. The apparatus of claim 16, wherein said means for calculating a merge-factor comprises means for calculating a merge-factor in accordance with said error change, said variance, said number of pixels in said second block group, and the current quantization, and wherein said error change represents the difference between first and second mean-square-error values.

18. The apparatus of claim 15, wherein said plurality of blocks of pixels comprises a row of pixel blocks in said target digital video image and said first and second adjacent pixel block groups are next to each other and in said row.

19. The apparatus of claim 18, wherein said means for assigning displacement vectors comprises:

1. means for assigning displacement vectors to said plurality of blocks of pixels in said target digital video image; and 2. means for ordering said displacement vectors in accordance with their frequency of occurrence in said target digital video image, and wherein said first selected pixel block group is associated with the displacement vector having the highest frequency of occurrence.

20. The apparatus of claim 15, wherein there is a 4-connected path between each block of pixels in said first pixel block group and all other pixel blocks in said first pixel block group, and wherein there is a 4-connected path between each block of pixels in said second pixel block group all other pixel blocks in said second pixel block group.

21. The apparatus of claim 20, wherein said means for assigning displacement vectors comprises:

1. means for assigning displacement vectors to said plurality of blocks of pixels;

2. means for ordering said displacement vectors in accordance with their frequency of occurrence in said target digital video image;

and wherein said first selected pixel block group is associated with the displacement vector having the highest frequency of occurrence.

22. An apparatus for forming an encoded digital video signal from a target digital video signal representative of a target digital video image within a sequence of one or more digital motion video images using motion compensation, said target digital video image being represented by an array of pixels, comprising:

(A) means for assigning displacement vectors to a plurality of parent pixel blocks in said target digital video image;

(B) means for dividing each parent pixel block into a plurality of target pixel blocks;

(C) means for selecting a target pixel block from said plurality of target pixel blocks;

(D) means for associating a plurality of parent pixel blocks with said selected target pixel block;

(E) means for calculating a plurality of error measures for said selected target pixel block by successively applying the displacement vector assigned to each associated parent pixel block to said selected target pixel block;

(F) means for selecting the displacement vector associated with the minimum error measure from said plurality of error measures;

(G) means for assigning said selected displacement vector to said selected target pixel block if said minimum error measure is below a threshold; and (I) means for forming said encoded digital video signal from said target digital video signal in accordance with said displacement vectors assigned to said plurality of target pixel blocks.

23. The apparatus of claim 22, wherein said means for assigning said selected displacement vector comprises:

1. means for calculating a variance value based on the magnitude of the pixels in said selected target pixel block;

2. means for calculating a test error measure in accordance with said minimum error measure, said variance and the current quantization level; and 3. means for assigning said selected displacement vector to said selected target pixel block if said test error measure is below a threshold.

\* \* \* \* \*

UNITED STATES PATENT AND TRADEMARK OFFICE
CERTIFICATE OF CORRECTION

PATENT NO. : 5,568,569
DATED : October 22, 1996
INVENTOR(S) : Stuart J. Golin

It is certified that error appears in the above-identified patent and that said Letters Patent is hereby corrected as shown below:

In the Claims:

Column 10, line 24:
   Delete "A)", and insert therefor --(A)--.
Column 10, line 26:
   Delete "B)", and insert therefor--(B)--.

Signed and Sealed this

Twenty-fifth Day of March, 1997

Attest:

BRUCE LEHMAN

*Attesting Officer*    *Commissioner of Patents and Trademarks*